United States Patent [19]
Currey

[11] Patent Number: 5,768,821
[45] Date of Patent: Jun. 23, 1998

[54] PROTECTED PLATFORM FOR HUNTERS

[76] Inventor: James D. Currey, 5054 W. University Blvd., Dallas, Tex. 75209

[21] Appl. No.: 712,807

[22] Filed: Sep. 12, 1996

[51] Int. Cl.⁶ .......................... A01M 1/14; B62D 63/04; A01K 3/00
[52] U.S. Cl. .................................... 43/114; 52/3; 52/101; 43/131
[58] Field of Search .......................... 43/114, 115, 131; 135/121, 122; 52/3, 5, 2.25, 101

[56] References Cited

U.S. PATENT DOCUMENTS

| | | | |
|---|---|---|---|
| 731,843 | 6/1903 | Bierley | 43/114 |
| 1,005,180 | 10/1911 | Ellis | 43/131 |
| 2,101,988 | 12/1937 | Epstein | 43/131 |
| 2,827,065 | 3/1958 | Chapron | 135/121 |
| 4,862,638 | 9/1989 | Stevenson | 43/114 |
| 5,353,556 | 10/1994 | Hand et al. | 52/101 |
| 5,392,559 | 2/1995 | Long | 52/101 |

*Primary Examiner*—Charles T. Jordan
*Assistant Examiner*—Theresa M. Wesson
*Attorney, Agent, or Firm*—George R. Schultz; Strasburger & Price

[57] ABSTRACT

A protected platform isolates its user from crawling insects. The platform has a central tarp area sized to comfortably accommodate the user. Around the periphery of the tarp is a raised boundary. A tape is attached to this boundary so that it presents an adhesive surface to any crawling insect attempting to traverse the boundary. The adhesive surface is downwardly disposed to protect it from debris or grass. The boundary can inflatable and can also contain foam to add rigidity.

3 Claims, 3 Drawing Sheets

5,768,821

PROTECTED PLATFORM FOR HUNTERS

BACKGROUND OF THE INVENTION

Being outdoors is a fulfilling experience for most. The chance to breathe the fresh air and feel the sunlight is a welcome break for anyone confined to an office during the week. Unfortunately outdoor excursions can easily be ruined, especially in the southern states, by fire ants and other crawling insects.

The problem with insects is especially acute for hunters. In many hunting scenarios, the hunter must crouch down on the ground and wait for the prey to come near. Of course, while he is crouching, ants will begin to bother and bite the hunter. Yet, movement to avoid the ants will deter the prey from coming near. Fire ants in particular have a terribly unpleasant sting which can take days to heal. Thus, the hunter is condemned to two bad options. Therefore, a need exists for a platform the a hunter can bring with him that provides a barrier against the incursion of crawling insects.

One attempt at such a barrier is shown in U.S. Pat. No. 4,862,638 to Stevenson entitled "tarp bug catcher." The tarp includes an adhesive strip around its periphery. The adhesive strip has its adhesive side up. Thus, if leaves where to blow over the tarp, the adhesive strip would be rendered useless. Further, the strip contains a poisonous substance to kill any bugs trapped on the adhesive strip.

A protected platform is needed to protect against crawling insects such as fire ants. The platform must be easy to transport and easy to use. More importantly, the platform must be absolutely effective at stopping the progress of fire ants and other stinging insects. In other words, the platform must maintain its effectiveness even when weather, dust, and blowing debris would render the prior art designs useless.

SUMMARY OF THE INVENTION

The present invention is a protected platform which overcomes many of the deficiencies of the prior art. The platform is a ground cloth or tarp that provides a protective barrier from fire ants and the like. The tarp features an inflatable polyurethane railing which is permanently affixed to the outer edge of the tarp. Inside the inflatable railing is a dense foam strip. The foam strip has a flange portion that extends outward from the perimeter of the tarp. A tape can be attached to the flange such that a portion of the adhesive extends beyond the flange. Thus, when an ant approaches the railing and progresses up its side, it will become entrapped on the adhesive.

In alternate embodiments, the boundary can be completely inflatable or include partitions to add rigidity. The boundary can also have a slotted portion on its upper surface to hold the tape. In another embodiment, the boundary is formed by several frame elements which easily interlock. In every instance, the platform can be compactly stored and carried, and easily assembled for use. The tape should be tacky enough to trap a crawling insect, yet still easily removed and disposed off prior to disassembly. In a preferred embodiment, the adhesive surface is downwardly disposed so that debris falling onto the boundary does not stick to the adhesive and provide a bridge across it. Thus, the protected platform answers the deficiencies of the prior art.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE DRAWINGS

Figure 1A:
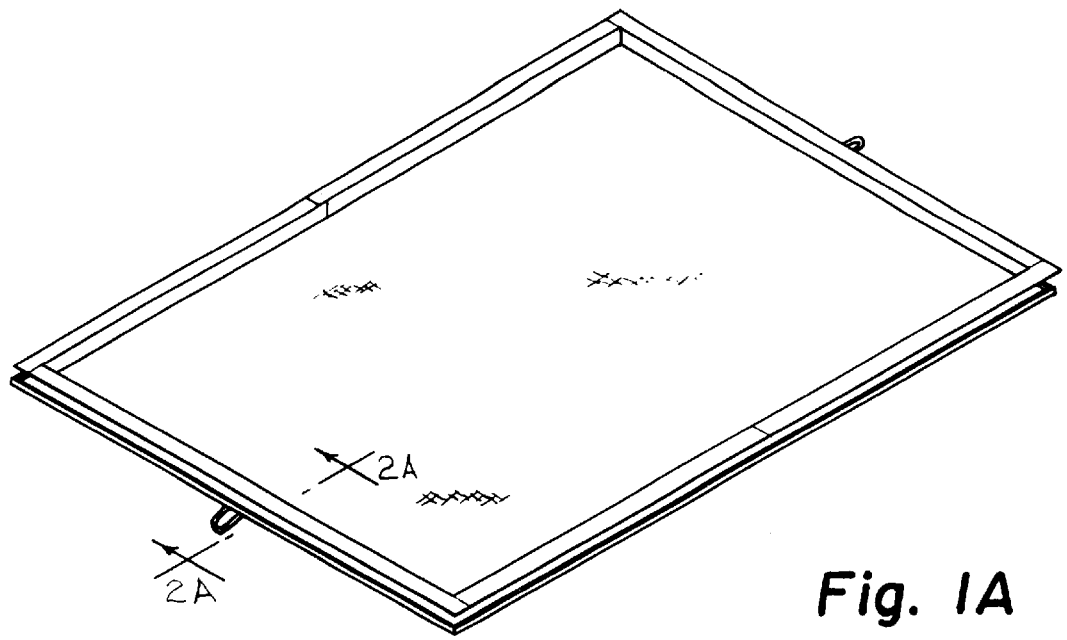
FIGS. 1A and 1B provide perspective views of the protected platform of the present invention both alone and in conjunction with a tent covering.
Figure 1B:
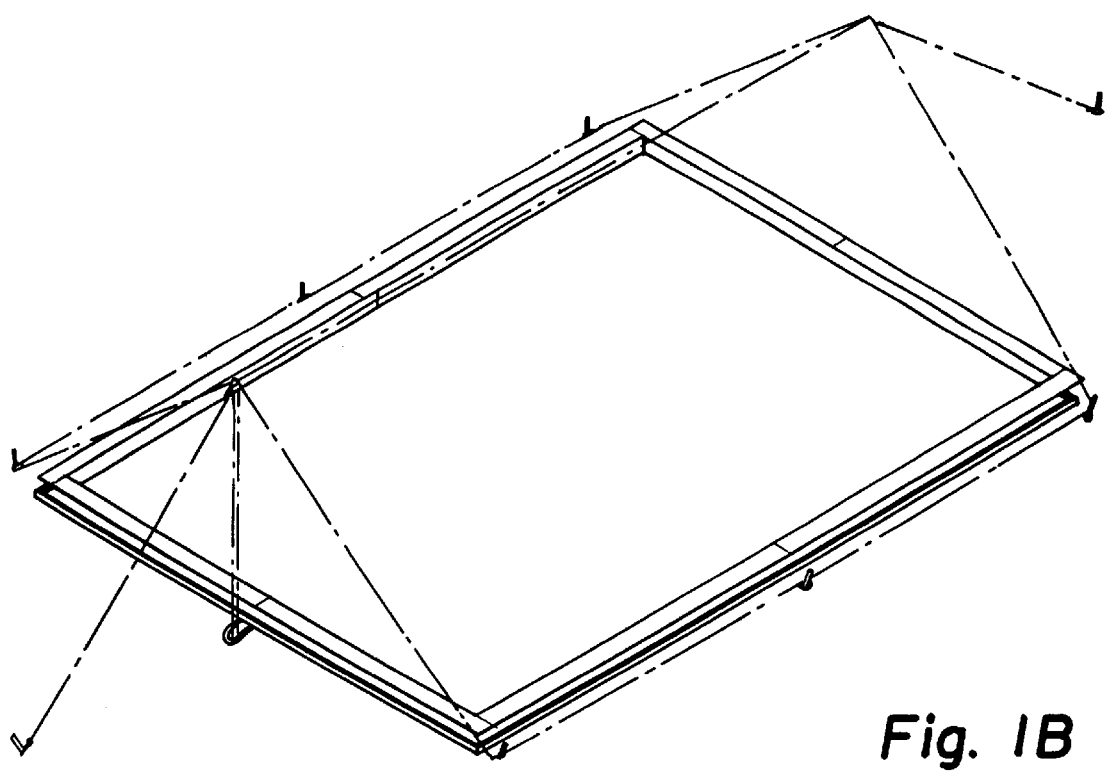

The present invention relates to a platform for a hunter which protects the hunter from crawling insects. The platform 10, shown in FIG. 1A, embodies the present invention. The platform 10 has a central portion 12 which can be any suitable size. The central portion or tarp 12 is surrounded by a raised boundary 14. As will be discussed in greater detail below, the boundary 14 can take a variety of profiles. The central portion 12 can be a single sheet of suitable material such as polyurethane. In another embodiment, the central portion can be padded or contain inflatable air pockets for added comfort for the user. Loops 16 can be used to attach the platform to the ground more securely. The platform 10 can also be used as the base of a tent 18 as illustrated in FIG.1B. In this configuration, the tent 18 is raised above the platform 10 and secured with ropes 20, stakes 22, and posts 24.

Figure 2A:
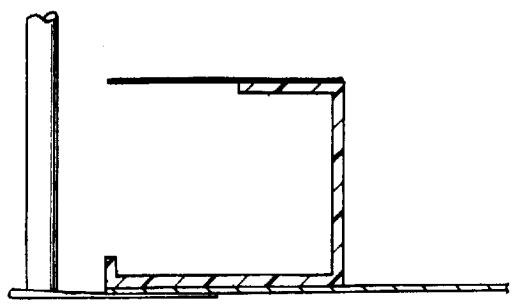
FIGS. 2A to 2F provide sectional views across various embodiments of the boundary located on the periphery of the protected platform.

FIG. 2A provides a sectional view of a first boundary 14 embodiment. The boundary 14 extends upward from the tarp 12. The boundary 14 has a bottom 28, side wall 26, and upper surface 30. The boundary can also have a forward lip 32. These surfaces must be suitably stiff to support a tape 34 attached to the upper surface 30. The tape 34 has an adhesive surface 34a on its bottom surface. The goal of the boundary 14 is to stop the progress of a crawling insect before it can reach the tarp 12 and the user. Thus, some ants are deterred by lip 32. If the ants successfully cross the lip 32, they can crawl up side wall 26 and under upper surface 30, only to encounter the adhesive surface 34a on tape 34. This will trap the ants, thereby protecting the user of the platform 10.

Figure 2B:
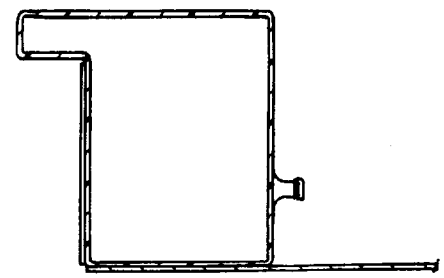

FIG. 2B illustrates an alternate design for boundary 14. In this embodiment, the boundary is formed by an inflatable enclosure attached to tarp 12. The enclosure has top and bottom surfaces 28, 30 and side walls 26, 32. Further, a sealable stem 38 is provided on one the side surfaces to allow for inflation on the boundary 14. This design has the advantage of being very compact when deflated. The upper surface 30 can even have an extended flange 36. Tape 34 (not shown) can be attached to extend beyond the flange 36 in similar fashion to the tape in FIG. 2A. Thus, when a crawling insect travels up side wall 32, it soon encounters the adhesive side 34a of tape fixed to the boundary. FIG. 2E illustrates a similar design, except for partitions 44 across the cavity within the boundary 14. The partitions 44 can be rigid, semi-rigid or pliable. The partition 44 can add stability to the upper surface making it more suitable for attachment of tape 34. The partitions 44 can have apertures 46 to allow air flow within the cavity.

Figure 2C:
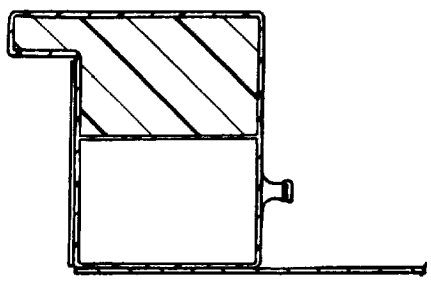
Figure 2D:
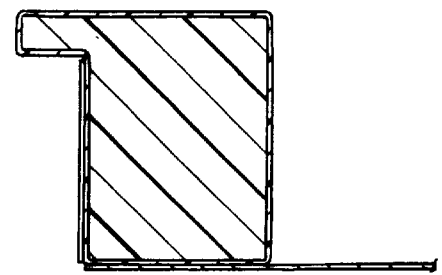
Figure 2E:
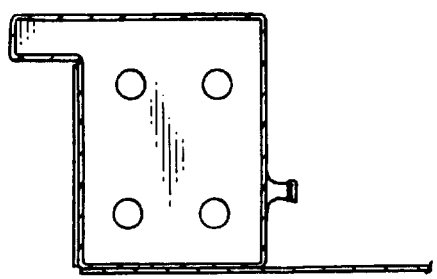

FIG. 2C and 2D illustrate variations on the design shown in FIG. 2B. In both, a foam 40 or other substance fills the cavity defined by the walls of the boundary 14. In FIG. 2C, a partial bladder 42 can still be inflated through sealable stem 38. In the embodiment shown in FIG. 2D, the entire cavity is filled with a foam 40. The foam should be light weight yet, stable enough to support tape 34 (not shown) on the upper surface 30.

Figure 2F:
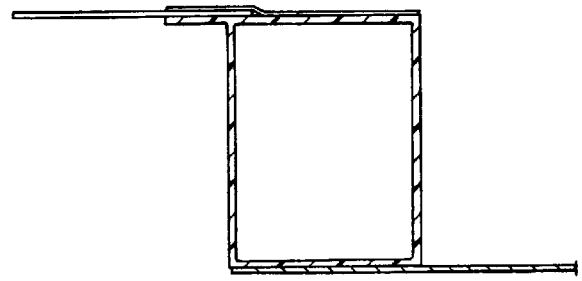

FIG. 2F illustrates another style of boundary 14. The boundary 14 has an upper surface 30 having a slotted portion 48. The slotted portion 48 can accept the tape 34. Again, any crawling insect who climbs the side wall 32 will become trapped on the adhesive surface 34a. A slotted design can hold a tape without the use of adhesive. Otherwise part of the adhesive surface must be used to adhere the tape to the upper surface 30 of the boundary 14.

Figure 3:
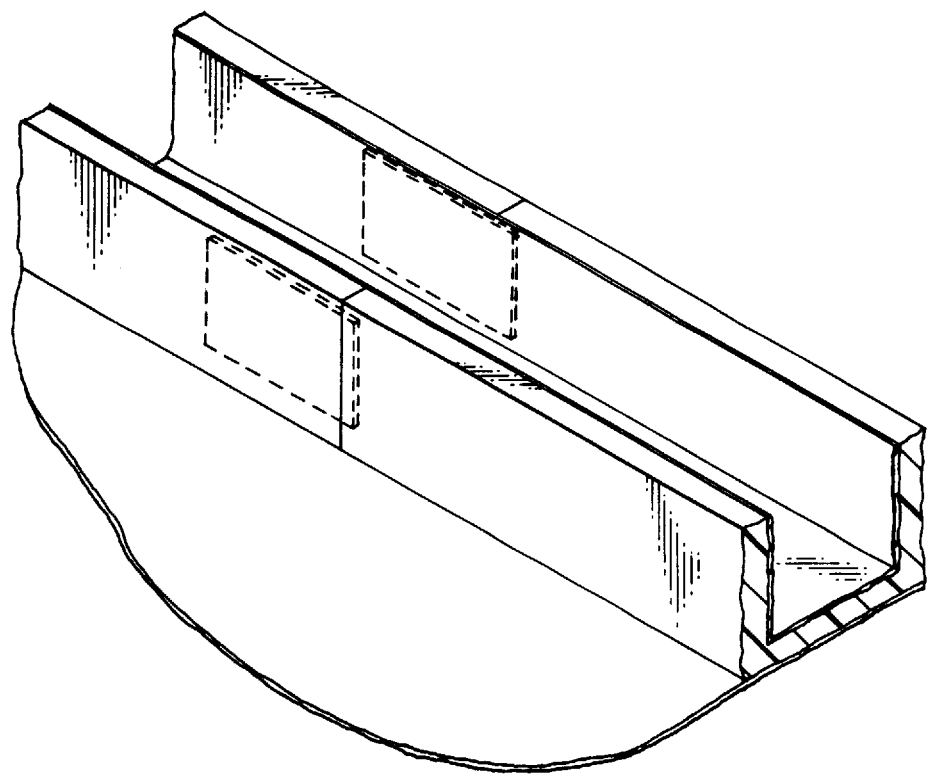
FIG. 3 illustrates a frame for another embodiment of the protected platform.

FIG. 3 illustrates an embodiment wherein the boundary is formed by a U-shaped frame 50. The frame can be a rigid material. In order to efficiently pack the platform, the frame can be disassembled into separate frame elements 50a, 50b. The frame elements can interlock or use a slot for accepting locking elements 52. The tarp can be attached to the frame elements 50 any suitable means. This design allows for a sturdy boundary, yet also provide for simple assembly and disassembly. A tape having an adhesive surface can be placed across the top of the frame elements.

Figure 4:
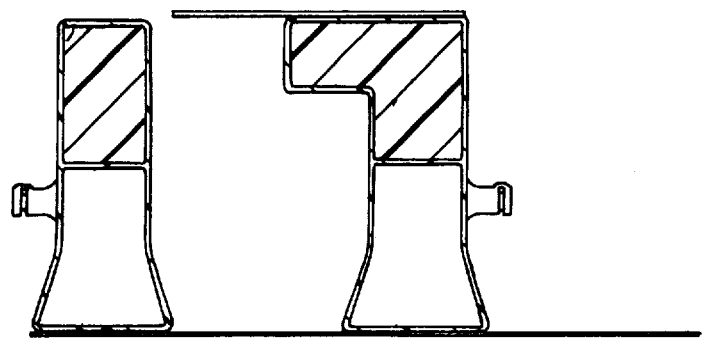
FIG. 4 provides a sectional view of a double boundary system for the protected platform.

FIG. 4 illustrates a double boundary system. The system has a first boundary 14a and a second boundary 14b. Both are located on the periphery of the tarp 12. In the version illustrated, both boundaries are similar to the embodiment described for FIG. 2C, having a partial bladder to inflate. A second boundary only improves the efficacy of the protected platform. The first boundary forms a barrier to reduce the risk of grass and blowing debris from contacting the adhesive surface 34A. Of course, debris on the tape would provide a bridge for the insect. A tape can be used on both of the boundaries although it is shown only attached to boundary 14b.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

I claim:

1. A protected platform comprising:
   (a) a tarp having a periphery;
   (b) a boundary extending upwards from the periphery of the tarp; and
   (c) a tape attached to the boundary having an exposed adhesive surface extending beyond the periphery of the tarp.

2. A protected platform comprising:
   (a) a tarp having a periphery;
   (b) a boundary extending upwards from the periphery of the tarp; and
   (c) a tape attached to the boundary having an exposed adhesive surface positioned downward.

3. A protected platform for isolating a user from crawling insects, said platform comprising:
   (a) a foldable tarp with a periphery;
   (b) a raised boundary attached to said tarp at the periphery of said tarp; and
   (c) an exposed adhesive surface attached to said boundary wherein said adhesive surface is downwardly disposed.

* * * * *